United States Patent [19]

Reinartz et al.

[11] Patent Number: 4,736,993
[45] Date of Patent: Apr. 12, 1988

[54] HYDRAULIC BRAKE SYSTEM WITH SLIP CONTROL FOR AUTOMOTIVE VEHICLES

[75] Inventors: Hans-Dieter Reinartz, Frankfurt am Main; Helmut Steffes, Eschborn, both of Fed. Rep. of Germany

[73] Assignee: Alfred Teves GmbH, Frankfurt am Main, Fed. Rep. of Germany

[21] Appl. No.: 884,196

[22] Filed: Jul. 10, 1986

[30] Foreign Application Priority Data

Jul. 31, 1985 [DE] Fed. Rep. of Germany ....... 3527317

[51] Int. Cl.[4] ............................ B60T 8/64; B60T 8/58; B60T 8/44
[52] U.S. Cl. ..................................... 303/110; 303/100; 303/114
[58] Field of Search ............................... 303/113–117, 303/119, 20, 92, 100, DIG. 3, DIG. 4, 110

[56] References Cited

U.S. PATENT DOCUMENTS 4,589,706  5/1986  Leiber ................................. 303/119
4,659,152  4/1987  Reinartz et al. ..................... 303/114

FOREIGN PATENT DOCUMENTS 3040548  5/1982  Fed. Rep. of Germany .
3151292  7/1983  Fed. Rep. of Germany .
3247496  6/1984  Fed. Rep. of Germany .
2086506  5/1982  United Kingdom .
2158900  5/1984  United Kingdom .
2148430 10/1984 United Kingdom .
2148428  5/1985  United Kingdom .
2148432  5/1985  United Kingdom .

Primary Examiner—Andres Kashnikow
Assistant Examiner—Timothy Newholm
Attorney, Agent, or Firm—James B. Raden; Robert P. Seitter

[57] ABSTRACT

A hydraulic brake system with slip control for automotive vehicles, comprising a master cylinder (2) pressurizable by a hydraulic power booster (1). The brake system further comprising valve elements (28, 29, 33, 36, 37, 38) which are disposed between the master cylinder (2) and the wheel brakes (30, 31, 34, 35), through which valves pressure fluid can be removed from the wheel brakes (30, 31, 34, 35) and replenished out of the pressure chamber (10) of the hydraulic power booster (1) through a change-over valve (26, 27, 42) controllable by a slip-monitoring arrangement (40). During a braking action after the first response of the slip-monitoring arrangement, further actions of pressure decrease and pressure increase in the wheel brakes are controllable by way of the pressure chamber (10) of the hydraulic power booster. During braking after response of the slip-monitoring arrangement (40), the change-over valve (26, 27, 42) with its inlet side is connectible in a self-holding fashion to the pressure chamber (10). Further, valves (26, 27) are arranged between the working chambers (16, 20) of the master cylinder (2) and at least the valve elements (30, 31), which valves after changeover of the first change-over valve (42) are connectible with their inlet side to the pressure chamber (10) by way of the first change-over valve (42).

4 Claims, 1 Drawing Sheet

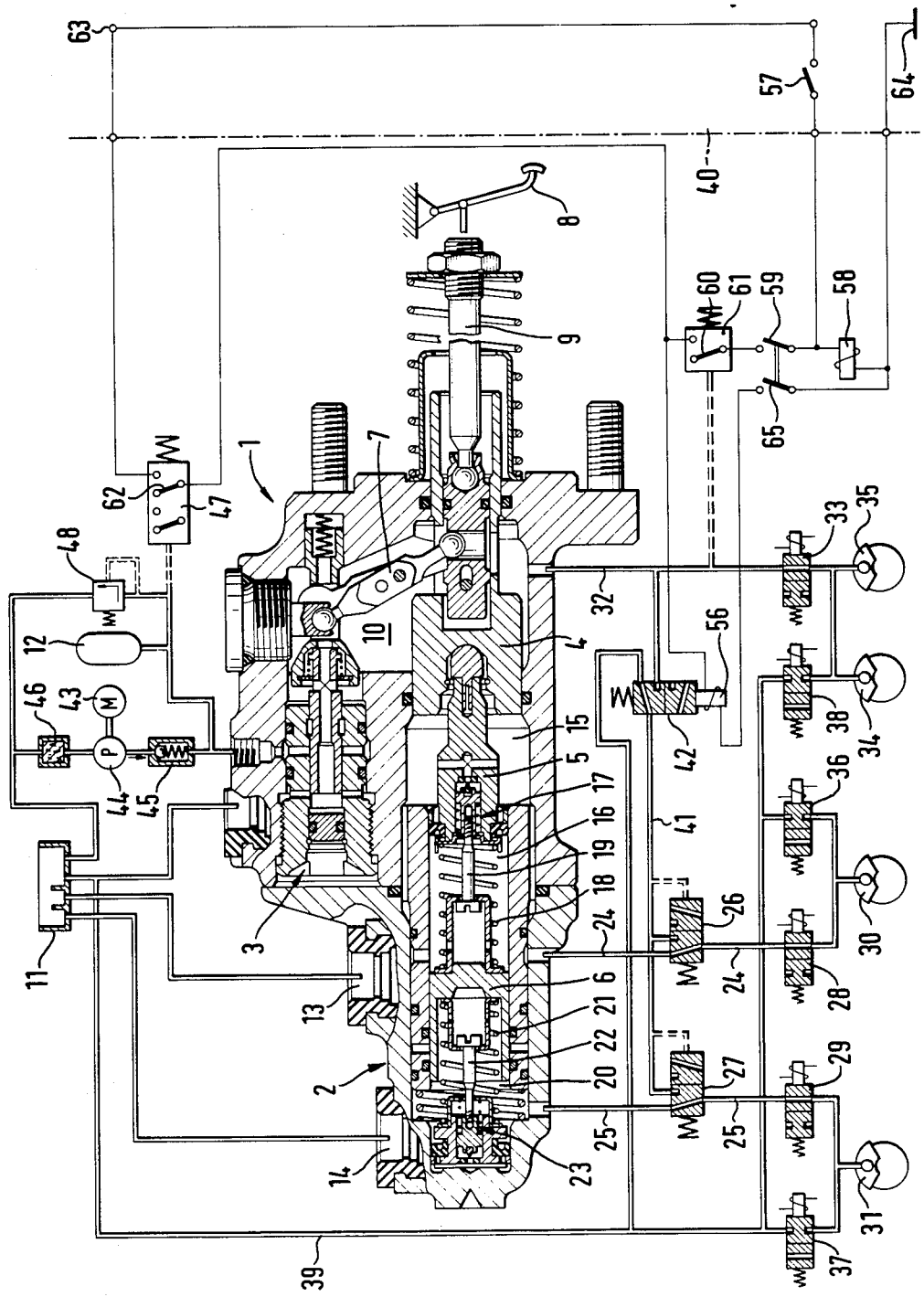

HYDRAULIC BRAKE SYSTEM WITH SLIP CONTROL FOR AUTOMOTIVE VEHICLES

BACKGROUND OF THE INVENTION

The present invention relates to a hydraulic brake system with slip control for automotive vehicles, comprising a master cylinder pressurizable by a hydraulic power booster. The brake system further comprising valve means which are disposed between the master cylinder and the wheel brakes connected to the master cylinder and which are controllable by a slip-monitoring arrangement and by which the wheel brakes are connectable to an unpressurized reservoir or to at least one brake line leading to the outlet of the master cylinder. The brake system further comprising a change-over valve which is controllable by the slip-monitoring arrangement and by which the brake line is connectible with the pressure chamber of the hydraulic power booster.

A hydraulic brake system of this type is known from German printed and published patent application No. 33 38 249. In a braking pressure generator arrangement, this brake system includes a tandem master cylinder which is actuated by the hydraulic power booster. By virtue of a brake valve, the hydraulic power booster sets the pressure in the pressure chamber such that it is proportional to the actuating force exerted on the brake pedal. Allocated to the wheel brakes connected to the working chambers of the tandem master cylinder are at least one pair of one normally opened and one normally closed multidirectional valves. The opened multidirectional valve is situated in the path of flow between the working chamber of the tandem master cylinder and the wheel brake, while pressure fluid can be discharged from the wheel brake through the closed multidirectional valve when the opened multidirectional valve has been switched by a slip-monitoring arrangement to assume its closed position.

Pressure supply of the hydraulic power booster is provided by a huydropneumatic pressure accumulator which is caused to maintain a predetermined pressure level by way of a pressure-fluid pump and a pressure monitor. The change-over valve is a three-way/two position directional valve, the coil of which is applied with operating voltage by way of the slip-monitoring arrangement when a critical slip condition occurs at any one or more of the vehicle wheels. After change-over of the three-way/two-position directional valve, the wheel cylinders are connected by way of valves with the pressure chamber of the hydraulic power booster so that the pressure fluid removed from the wheel brakes during slip control can be replenished out of the pressure chamber of the power booster. Hence it follows that pressurization of the wheel brakes is performed dynamically through central valves connected downstream of the master-cylinder chambers.

It is an object of the present invention to improve upon a hydraulic brake system of the type referred to so that during a braking action after the first response of the slip-mounting arrangement, further actions of pressure reduction and pressure increase in the wheel brakes are controllable by way of the pressure chamber of the hydraulic power booster.

SUMMARY OF THE INVENTION

This object is achieved by the present invention in that the outlet of the master cylinder is closable by the change-over valve, and in that the change-over valve, after its actuation during response of the slip-monitoring arrangement, is adapted to be kept in its actuating position by the pressure in the pressure chamber of the power booster. If slip control is terminated, and the braking action continuous, the change-over valve remains in its position set by the slip-monitoring arrangement. The pressure increase and pressure reduction taking place during the further braking action is performed by way of the pressure chamber of the power booster. The pressure chamber of the power booster forms a dynamic circuit for the pressure fluid together with the change-over valve and the wheel brakes as well as the valve means connected upstream of the wheel brakes. Unless the brake pedal is shifted by foot depression, it remains in its initially adopted position until the end of the braking action. As soon as the pressure in the pressure chamber of the power booster, due to shift of the brake pedal, drops below a threshold which is predefinable by adjustment of the pressure switch, the change-over valve and the other valves will re-assume their initial position. The residual volume of pressure fluid present in the wheel brake cylinders will therefore flow back to the working chambers of the tandem master cylinder.

In case the accumulator pressure drops below a limit value set at the pressure monitor, the voltage supply to the coil of the change-over valve will be interrupted so that the valve returns to its initial position. It is of particular advantage in the brake system of the present invention that pressure pulses do not take effect on the brake pedal, such disengagement being achieved owing to the set position of the valves connected downstream of the working chambers of the tandem master cylinder. Moreover, in a properly working brake system, the pressure reduction no longer takes place by way of the sensitive central valves of the master cylinder.

According to a preferred embodiment of this invention, the change-over valve is operable through a coil to which operating voltage is applied by way of a pressure switch and a pressure monitor in a self-holding position of a relay actuatable by the slip-monitoring arrangement. As soon as the coil of the change-over valve has the operating voltage applied by virtue of the slip-monitoring arrangement, the change-over valve will remain in the position it assumed until the pressure in the pressure chamber of the power booster or in the pressure accumulator, respectively, has fallen under the predefined threshold.

In a preferred embodiment of this invention, the change-over valve includes at least one hydraulically actuatable main valve and an electromagnetically actuatable auxiliary valve, through which the control port of the main valve is connectible to the unpressurized reservoir or to the pressure chamber of the power booster. The advantage of this embodiment is that the change-over actions can be accomplished with low magnet forces. Further, there is the possiblity of actuating several main valves by one electromagnetically held auxiliary valve.

Preferably, a coil of the relay which can be applied with operating voltage by the slip-monitoring arrangement arranged in series with a first normally-open relay contact and normally-open contacts of the pressure switch and the pressure monitor between the pole of an operating-voltage source and mass. The coil of the first change-over valve is arranged in series with another normally-open relay contact in parallel to the series arrangement of the first normally-open relay contact and the normally-open contact of the pressure switch. The pressure switch may have an operating threshold which is adjustable to a minimum pressure in the pressure chamber. Expediently, the pressure monitor is adjustable to a bottom limit value of the pressure in the pressure accumulator, at which value the brake system is still operable by the pressure.

According to another embodiment of the present invention, the valve means for the wheel brakes of the rear wheels of the automotive vehicle are connected to the pressure chamber, and the valve means for the front wheels in each case communicate with one or more of the change-over valves.

In the case of a brake system in which the master cylinder is a dual-circuit brake cylinder to which two groups of wheel brakes are connected by way of two separate brake lines, each brake line contains a main valve actuatable by the inlet pressure, and connected upstream of the inlets of the two main valves is one single auxiliary valve which is operable by the slip-monitoring arrangement and which can be held in its actuating position by the pressure in the pressure chamber. This minimizes the structural efforts required for realization of this invention and ensures reliable closing of the outlets of the dual-circuit master cylinder even in the presence of high actuating pressures.

BRIEF DESCRIPTION OF THE DRAWING

The present invention will be explained in more detail hereinbelow by way of a preferred embodiment which is illustrated in the accompanying drawing wherein the sole FIGURE displays the circuit diagram of a hydraulic brake system with a first braking pressure generator illustrated in cross-section.

DETAILED DESCRIPTION

The braking pressure generator is composed of a hydraulic power booster 1 through which a tandem master cylinder 2 is actuatable. The hydraulic power booster 1 comprises a brake valve 3 which is arranged subtantially in parallel to the axis of the booster piston 4 of the power booster 1 and, respectively, of the master cylinder pistons 5 and 6 of the tandem master cylinder 2. By way of a lever assembly 7, brake valve 3 is connected with a push rod 9 coupled to a brake pedal 8. Moreover, the hydraulic power booster 1 accommodates a pressure chamber 10 which, in the brake release position, communicates by way of the brake valve 3 with an unpressurized supply reservoir 11. When the brake pedal 8 is depressed, pressure fluid out of a hydropneumatic pressure accumulator 12 is delivered through the brake valve 3 into the pressure chamber 10 of the hydraulic power booster 1, and pressure proportional to the actuating force is generated in the pressure chamber 10.

The tandem master cylinder 2 contains two reservoir ports 13, 14 through which it is connected to two compartments of the supply reservoir 11. Through a line disposed outside of the cross-sectional plane, the reservoir port 13 communicates with a supply chamber 15, into which the booster piston 4 plunges when performing an actuating stroke. The master cylinder piston 5 taking direct support on the booster piston 4 isolates the supply chamber 15 from a working chamber 16 of the tandem master cylinder 2. In the interior of the master cylinder piston 5, there is provision of a central valve 17 which, in the initial position illustrated, is kept open by a restoring spring 18 by way of rod 19, and which establishes a hydraulic connection between the working chamber 16 and the supply chamber 15 closable on actuation of the master cylinder piston 5. Disposed between the working chamber 16 and a second working chamber 20 is the floatingly arranged master cylinder piston 6 which is urged against the rods 19 by a restoring spring 21. Further, restoring spring 21, by way of rods 22, keeps a central valve 23 arranged on the bottom of the tandem master cylinder 2 open in the initial position illustrated, the valve providing a hydraulic connection from the working chamber 20 to the reservoir port 14.

Brake lines 24, 25 lead from the working chambers 16, 20 to pressure-controlled main valves 26, 27 and from there on further by way of electromagnetically actuatable two-way/two-position directional valves 28, 29 to the wheel brakes 30, 31 for the right and the left front wheel of a vehicle. Furthermore, a brake line 32 leads from the pressure chamber 10 by way of an electromagnetically actuatable two-way/two-position directional valve 33 to the wheel brakes 34, 35 for a right and a left rear wheel of a vehicle. Additionally, by way of electromagnetically actuatable two-way/two-position directional valves 36, 37, 38, the wheel brakes 30, 31, 34, 35 are connected to a return line 39 which leads to the supply reservoir 11. The two-way/two-position directional valves 28, 29, 33 are opened in their initial position, while the two-way/two-position directional valves 36, 37, 38 are closed in their initial position. All two-way/two-position directional valves 28, 29, 33, 36, 37, 38 are controllable in pairs by a slip-monitoring arrangement 40 such that the actuating pressure at the wheel brakes 30, 31, 34, 35 can be decreased and re-increased and locking of the wheels can be prevented.

The main valves 26, 27 inserted into the brake lines 24, 25 are designed as three-way/two-position directional valves. With one inlet and with their control ports inserted in parallel, they are connected to a connecting line 41 extending to the outlet of an electromagnetically actuatable auxiliary valve 42. Auxiliary valve 42 which is likewise designed as a three-way/two-position directional valve connects the connecting line 41 to the return line 39 in an initial position and to the pressure chamber 10 of the power booster 1 through the brake line 32 in a switched position.

Further, as illustrated in the drawing the hydropneumatic pressure accumulator 12, by way of a non-return valve 45, is charged by a pressure-fluid pump 44 adapted to be driven by an electric motor 43. For this purpose, the suction side of the pump is in communication with the unpressurized supply reservoir 11 by way of a filter element 46. Switching on and off of the electric motor 43 takes place by way of a pressure monitor 47, the maximally attainable pressure in the pressure accumulator 12 being limited by a safety valve 48.

A switch 57 is provided in the slip-monitoring arrangement 40 which is closed upon an imminent locked condition of one or more wheels and upon commencement of slip control. Switch 57 is connected to the coil 58 of a relay, which coil is arranged in series with a normally-open relay contact 59, a normally-open contact 60 of a pressure switch 61 and a normally-open contact 62 of the pressure monitor 47 between a pole 63 of an operating-voltage source and mass 64. In parallel to the series connection of the normally-open contact 60 of the pressure switch 61 and the normally-open relay contact 59 as well as the coil 58, another normally-open relay contact 65 is connected in series with the coil 56 of the auxiliary valve 42. The normally-open relay contacts 59, 65 are coupled mechanically, that means they are adapted to be switched on jointly upon excitation of the coil 58. Pressure switch 61 will respond in excess of a specific preadjustable pressure in the pressure chamber 10. The normally-open contact 62 of the pressure monitor 47 will respond when the pressure in the pressure accumulator 12 drops below a bottom limit value. This limit value is of particular importance for proper operation of the brake system illustrated in FIG. 1.

Hereinbelow, the mode of funciton of the brake system will be described in more detail, starting from the condition of brake release in which no actuating force is exerted on the brake pedal 8 and all parts assume their position as illustrated in the drawing. The pressure monitor 47 is closed, since the electric motor 43 is switched on and the pressure accumulator 12 is charged. When an actuating force is exerted on the brake pedal 8, the pressure chamber 10 of the hydraulic power booster 1 will first be isolated from the unpressurized supply reservoir 11 by the brake valve 3. After a predeterminable actuating travel, pressure fluid out of the hydropneumatic pressure accumulator 12 is introduced by way of the brake valve into the pressure chamber 10, the pressure prevailing in the pressure chamber 10 being in each case proportional to the actuating force exerted on the brake pedal 8. After the hydraulic pressure in the pressure chamber 10 of the hydraulic power booster 1 has exceeded a certain level, the booster piston 4 will move to the left, when viewed in the drawing, the movement of the booster piston 4 being transmitted onto the master cylinder piston 5. The pressure switch 61 will respond at the same time and close the normally-open contact 60. After a small travel of the master cylinder piston 5, the central valve 17 will close so that the working chamber 16 of the tandem master cylinder 2 is isolated from the unpressurized supply reservoir 11. Continued displacement of the master cylinder piston 5 in the actuating direction has as a result, with the valve 17 closed, that hydraulic pressure develops in the working chamber 16 of the tandem master cylinder which finally causes hydraulic displacement of the master cylinder piston 6 in the actuating direction and closing of the central valve 23. Hence it follows that pressure also develops in the second working chamber 20 of the master cylinder 2, when the central valve 23 is closed. The hydraulic pressures generated in the working chambers 16, 20 propagate by way of the brake lines 24, 25 to the wheel brakes 30, 31, and the pressure in the pressure chamber 10 propagates through the brake line 32 to the wheel brakes 34, 35 so that the vehicle is slowed down.

When the slip-monitoring arrangement 40 now detects a critical slip value at one or more of the vehicle wheels monitored, the switch 57 will be closed. Caused thereby, operating voltage is applied to the coil 58, and the normally-open relay contacts 59, 65 will close. Thus, coil 56 also will be applied with operating voltage so that the auxiliary valve 42 switches to its operating position, as a result whereof pressure fluid out of the pressure chamber 10 of the hydraulic power booster 1 is allowed to propagate to the control ports and the inlets of the hydraulically actuatable main valves 26, 27. Thereupon, the main valves 26, 27 will be switched over, thereby interrupting the connection from the working chambers 16, 20 to the wheel brakes 30, 31 and connecting the pressure chamber 10 to the wheel brakes 30, 31. By way of the normally-open relay contact 59, the coil 58 is connected to the pole 63 in a self-holding manner. Variations of the switch position of switch 57, therefore, will not have any effect on the closed-circuit condition of the relay.

It shall now be assumed that the vehicle wheel allocated to the wheel brake 30 has a critical slip value. First, the slip-monitoring arrangement 40 will switch the two-way/two-position directional valve 28 to assume a closed position, and as a result the pressure in the wheel brake 30 remains constant irrespective of the pressure in the brake line 24 and in the pressure chamber 10 of the hydraulic power booster 1. If keeping the pressure constant does not suffice to bring about re-acceleration of the vehicle wheel allocated to the vehicle brake, the two-way/two-position directional valve 36 also will be switched so that pressure fluid is removed from the wheel brake 30 and discharges to the supply reservoir 11, the braking pressure dropping thereby. The pressure fluid removed from the wheel brake 30 will be replenished out of the pressure chamber 10 of the hydraulic power booster 1 through the main valve 26 and the auxiliary valve 42.

Even if the slip control action is terminated, but the braking action still continues, the auxiliary valve 42 remains excited so that the main valves 26, 27 shut off the working chambers 16, 20 as before, and stroke limitation of the master cylinder pistons 5, 6 takes place. This means that the complete pressure increase and pressure reduction in the wheel brakes 30, 31, 34, 35 is performed by way of the pressure chamber 10. The brake pedal 8 remains in its one assumed position until the pressure switch 61 is switched off. If, for instance, during release of the brake, the pressure in the pressure chamber 10 drops below the limit set at the pressure switch 61, pressure switch 61 will disable. The relay will then drop out. The auxiliary valve 42 and the main valves 26 and 27 will re-adopt their initial position. The residual volume of pressure fluid out of the wheel brakes is received by the tandem master cylinder 2.

If the pressure in the pressure accumulator 12 drops below the critical limit in the event of slip control, the auxiliary valve 42 will be switched off by the pressure monitor 47. Subsequently, pressure can be built up in the working chambers 16, 20 of the tandem master cylinder 2 by way of the brake pedal 8 which is sufficient for a minimum deceleration. Additionally, a simular fail condition is recognized by the slip-monitoring arrangement 40 so that also the valves 28, 29, 33, 36, 37, 38 will not change their switch position.

What is claimed is:

1. A hydraulic brake system with slip control for automotive vehicles, comprising a master cylinder pressurizable by a hydraulic power booster comprising a pressure chamber and a hydraulic fluid pressure accumulator connectable to said pressure chamber, and said hydraulic brake system further comprising valve means which are disposed between the master cylinder and the wheel brakes connected to the master cylinder and which are controllable by a slip-monitoring arrangement and by which the wheel brakes are connectable to an unpressurized reservoir and to at least one brake line leading to the outlet of the master cylinder, and further comprising a change-over valve means which is controllable by the slip-monitoring arrangement and by which the brake line is connectable with the pressure chamber of the hydraulic power booster, wherein the outlet of the master cylinder (2) leading to the brake line (24, 25) is closable by the change-over valve means (26, 27, 42), and wherein the change-over valve means (26, 27, 42) after its actuation during response of the slip-monitoring arrangement (40) is held in its actuating position by the pressure in the pressure chamber (10);

wherein an element (42) of the change-over valve (26, 27, 42) is actuatable magnetically by a coil (56) which is applied with operating voltage by way of a pressure switch (61) and a pressure monitor (47) upon initiation of slip control and is maintained in a self-holding position by a relay actuatable by the slip-monitoring arrangement (40); and, wherein a coil (58) of the relay which can be applied with operating voltage by the slip-monitoring arrangement (40) is arranged in series with a first normally-open relay contact (59) and normally-open contacts (60, 62) of the pressure switch (61) and the pressure monitor (47) between the pole (63) of an operating-voltage source and a mass (64), and wherein the coil (56) of the change-over valve (42) is arranged in series with another normally-open relay contact (65) in parallel to the series connection of the first normally-open relay contact (59) and the normally-open contact (60) of the pressure switch (61).

2. A hydraulic brake system as claimed in claim 1, wherein the pressure switch (61) has an operating threshold which is adjustable to a minimum pressure in the pressure chamber (10).

3. A hydraulic brake system as claimed in claim 1, wherein the pressure monitor (47) is adjustable to a bottom limit value of the pressure in the pressure accumulator (12), at which value the brake system is still operable by the pressure prevailing in the pressure accumulator.

4. A hydraulic brake system as claimed in claim 1, wherein the valve means (33, 38) for the wheel brakes (34, 35) of the rear wheels of the automotive vehicle are connected to the pressure chamber (10), and wherein the valve means (28, 36; 29, 37) for the wheel brakes (30, 31) of the front wheels are in each case communicating with one or more of the change-over valve means (26, 27, 42).

* * * * *